US009015253B1

(12) United States Patent
Jarrett

(10) Patent No.: US 9,015,253 B1
(45) Date of Patent: Apr. 21, 2015

(54) SYSTEM AND METHOD FOR COPYING TEXT MESSAGES OF A MINOR TO BE MONITORED BY A GUARDIAN

(75) Inventor: Keith Jarrett, Newport Beach, CA (US)

(73) Assignee: Amber Watch Foundation, Seal Beach, CA (US)

( * ) Notice: Subject to any disclaimer, the term of this patent is extended or adjusted under 35 U.S.C. 154(b) by 366 days.

(21) Appl. No.: 12/837,372

(22) Filed: Jul. 15, 2010

(51) Int. Cl.
 *G06F 15/16* (2006.01)
 *H04L 29/06* (2006.01)

(52) U.S. Cl.
 CPC ................................. *H04L 29/06986* (2013.01)

(58) Field of Classification Search
 CPC . H04L 29/08675; H04L 67/025; H04L 67/22; H04L 63/30; G06F 11/34
 USPC .......................................... 709/206–207, 224
 See application file for complete search history.

(56) References Cited

U.S. PATENT DOCUMENTS

| | | | |
|---|---|---|---|
| 2006/0036689 A1* | 2/2006 | Buford et al. .................. 709/206 |
| 2006/0179003 A1* | 8/2006 | Steele et al. ..................... 705/59 |
| 2006/0217136 A1* | 9/2006 | Bantukul et al. .............. 455/466 |
| 2007/0211876 A1* | 9/2007 | Othmer et al. ........... 379/201.01 |
| 2008/0005250 A1* | 1/2008 | Oksum ......................... 709/206 |
| 2008/0005254 A1* | 1/2008 | Adolphs et al. ............... 709/207 |
| 2008/0102866 A1* | 5/2008 | Fiorillo et al. ................. 455/466 |
| 2008/0300967 A1* | 12/2008 | Buckley et al. .................. 705/10 |
| 2009/0089417 A1* | 4/2009 | Giffin et al. .................... 709/224 |
| 2009/0174551 A1* | 7/2009 | Quinn et al. .................... 340/540 |
| 2009/0271831 A1* | 10/2009 | Binno et al. ...................... 725/93 |
| 2009/0292779 A1* | 11/2009 | Edlund et al. ................. 709/206 |
| 2010/0110927 A1* | 5/2010 | Cermak et al. ................. 370/252 |
| 2010/0330960 A1* | 12/2010 | Ravishankar et al. ......... 455/410 |
| 2011/0035799 A1* | 2/2011 | Handler .......................... 726/21 |
| 2011/0065419 A1* | 3/2011 | Book et al. ..................... 455/411 |
| 2012/0005026 A1* | 1/2012 | Khan et al. ................. 705/14.64 |

* cited by examiner

*Primary Examiner* — Jason Recek
(74) *Attorney, Agent, or Firm* — Morgan, Lewis & Bockius LLP

(57) ABSTRACT

The present invention provides methods, systems, and computer program products for copying text messages sent to or from a user, such as a child or minor to a location external to the user's mobile device, for review by a third party having a legal right to view the user's messages, such as a parent or guardian. One aspect of the invention is a method of copying a user's messages. The text message carrier server system receives a text message from a sender addressed to a receiver. It sends the text message to the receiver. It also checks a monitor list for the receiver or the sender, and when the receiver or the sender is on the monitor list, it sends a copy of the text message content to a remote text message monitoring system.

25 Claims, 6 Drawing Sheets

SYSTEM AND METHOD FOR COPYING TEXT MESSAGES OF A MINOR TO BE MONITORED BY A GUARDIAN

TECHNICAL FIELD

The disclosed embodiments relate generally to copying SMS textual messages sent to and from a user's mobile device for review by a third party having a legal right to view the user's messages. The user is likely a minor and the third party is likely a parent or guardian interested in protecting the minor from unsavory content or contacts. The present invention discloses mechanism for initiating text message monitoring to ensure that the third party has a legal and legitimate right to view the user's messages as well as the process of saving a copy of each message for monitoring.

BACKGROUND

Many young people have cellular phones and use textual messaging extensively to communicate. It is possible for these young people to be exposed to unsavory and inappropriate content or to be contacted by dangerous people, such as child molesters, through textual messaging. Putting monitoring software onto cellular phones of young people helps alleviate these risks. However, providing monitoring software that is compatible with the hundreds of mobile phones is extremely difficult for providers. Furthermore, it may be difficult for a parent to locate and load monitoring software onto their child's phone even when proper software exists. Therefore, it would be highly desirable to provide a mechanism and method to provide a monitoring service that would be equally-effective on any cellular phone.

SUMMARY

The present invention overcomes the limitations and disadvantages described above by providing methods and systems for copying text messages sent to or from a user, such as a child or minor to a location external to the user's mobile device, for review by a third party having a legal right to view the user's messages, such as a parent or guardian.

One aspect of the invention is a method of copying a user's messages. The method is performed on a text message carrier server system having one or more processors and memory storing one or more programs for execution by the one or more processors. The text message carrier server system receives a text message from a sender addressed to a receiver. It sends the text message to the receiver. It also checks a monitor list for the receiver or the sender, and when the receiver or the sender is on the monitor list, it sends a copy of the text message content to a remote text message monitoring system.

Another aspect of the invention is method of initiating text message monitoring. The method is performed on a server system having one or more processors and memory storing one or more programs for execution by the one or more processors. The server system receives a request for monitoring text messages to and from a client device associated with a user. It sends an opt-in message to the client device. It receives a confirmation of the opt-in message from the client device, and then sending the client device an activation message including information for signing up on a monitoring website for monitoring of text messages to and from the mobile device. After the user uses the activation message information to sign up on the monitoring website, the server system receives, from the website, confirmation that the monitoring request is legitimate and legal and that the client device has been set up for monitoring of messages to and from the client device. Then the server system instructs a text message carrier server system to copy each message sent to or from the client device.

Yet another aspect of the invention is a server system comprising one or more central processing units, CPU(s), for executing programs and also includes memory sorting the programs to be executed by the CPUs. The programs include instructions to perform any of the embodiments of the aforementioned copying and/or monitoring initiation methods. Such a server system may also include program instructions to execute the additional options discussed above and throughout the detailed description in this application.

Still another aspect of the invention involves embodiments of a computer readable storage medium storing one or more programs configured for execution by a computer. The programs include instructions to perform any of the embodiments of the aforementioned copying and/or monitoring initiation methods method. Such a computer readable storage medium may also include program instructions to execute the additional options discussed above.

Another aspect of the invention is a method of initiating text message monitoring performed on a client device. The client device has one or more processors and memory storing one or more programs for execution by the one or more processors. The client device receives an opt-in text message requiring confirmation of a monitoring request. (The original monitoring request was sent to a server system from the client device or by another means.) The user using the client device responds to the opt-in message by confirming the monitoring request. Then the client device receives an activation text message including information for signing up on a monitoring website for monitoring of text messages to and from the mobile device. A third party then visits the monitoring website and signs up for monitoring of text messages to and from the client device according to the information received in the activation message. In some embodiments, the visiting of the monitoring website is performed on the client device, while in other embodiment it is performed on another device.

Yet another aspect of the invention is a client system comprising one or more central processing units, CPU(s), for executing programs and also includes memory sorting the programs to be executed by the CPUs. The programs include instructions to perform any of the embodiments of the aforementioned initiation method. Such a client system may also include program instructions to execute the additional options discussed above and throughout the detailed description of this application.

Still another aspect of the invention involves embodiments of a computer readable storage medium storing one or more programs configured for execution by a computer. The programs include instructions to perform any of the embodiments of the aforementioned client method. Such a computer readable storage medium may also include program instructions to execute the additional options discussed above.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms.

These terms are only used to distinguish one element from another. For example, a first message could be termed a second message, and, similarly, a message could be termed a first message, without departing from the scope of the present invention. The first message and the second message are both messages, but they are not the same message.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Furthermore, as used herein, the term "if" may be construed to mean "when" or "upon" or "in response to" depending on the context.

Figure 1:
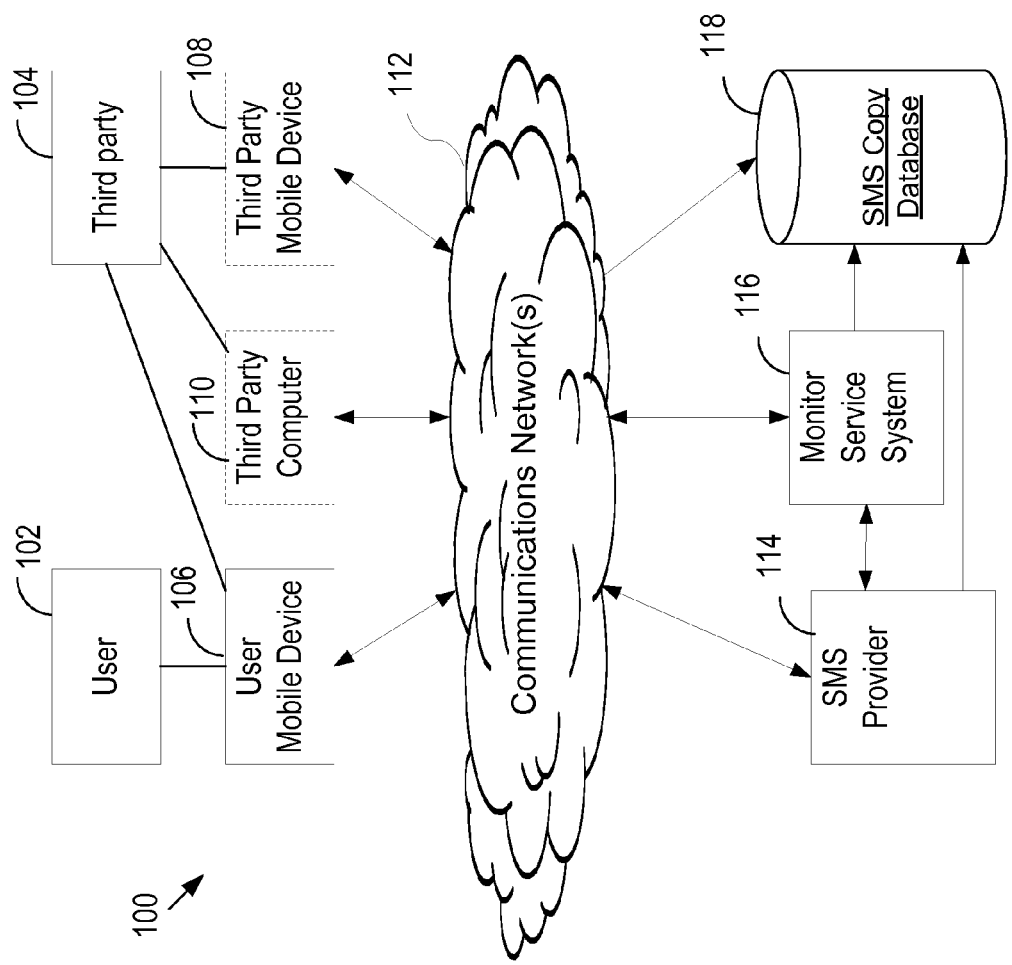
FIG. 1 is a block diagram illustrating an exemplary distributed text messaging system, in accordance with one embodiment of the invention.

FIG. 1 is a block diagram illustrating an exemplary distributed text messaging system, in accordance with one embodiment of the invention. The text messaging system includes a user 102 and a third party 104. The third party is an individual who has a relationship with the user such that the third party has a legal right to view the user's text messages. For example, in some embodiments, the user is a child or minor and the third party is a parent or guardian of the user. The user has a user mobile device 106, sometimes described herein as a client device or client mobile device. The user/client mobile device 106 can be any conventional device for sending and receiving text messages/SMS messages such as a cellular telephone or other mobile computing device. The user mobile device 106 may be owned by another party such as the third party (i.e., the mobile device may have been purchased by and the contract may be paid for by someone other than the user). However, for purposes of this disclosure the device is considered the user's mobile device 106 because it is operated by the user 102 to send and receive SMS text messages. The system further includes a third party mobile device 108 and or a third party computer 110, either or both of which are used by the third party 104 to communicate with or receive information from an external source via the communications network 112, such as the Internet, cellular network, other wide area networks, local area networks, metropolitan area networks, and so on. The external sources include one or more of an SMS provider 114, a monitor service 116, and/or an SMS Copy Database 118.

The SMS provider 114 is typically a system that provides SMS and telephone services to a variety of clients including the user mobile device 106. In some embodiments, the SMS provider is a mobile carrier while in other embodiments the SMS provider is an outside party engaged by the carrier to at least provide SMS services. The monitor service 116 is an external system that receives copies of the user's SMS textual messages from the SMS provider 114, as explained with reference to FIGS. 2A-2B. The SMS copy database 118 is a database that stores copies of all of the user's SMS textual messages. In some embodiments, the copies of the user's SMS textual messages are send directly from the SMS provider 114 to the SMS copy database 118, while in other embodiments, the messages are sent from the SMS provider 114 to the monitor service 116, which then sends them to the SMS copy database 118.

Furthermore, in some embodiments, various messages are sent from one or more of the external sources to the user 102 or the third party 104 via the communications network 112. For example, in some embodiments, the monitor service 116 reviews the copies of the user's SMS textual messages for potentially dangerous content, and if potentially dangerous content is found, the monitor service 116 sends alert messages to the third party 104 via one or both of the third party computer 110 and third party mobile device. In some embodiments, the alert message is sent from the monitor service 116 to the SMS provider 114 for distribution to the third party 104, while in other embodiments the alert messages are sent directly from the monitor service 116. Also, in some embodiments, periodic reminder messages indicating that the user's messages are being copied are sent from the SMS provider 114 or the monitor service 116 to the user's mobile device 106. Also, the third party 104 can view the copies of the user's messages stored in the SMS copy database 118 using either the third party computer 110 or the third party mobile device 108. In some embodiments, the third party 104 directly accesses the SMS copy database 118, while in other embodiments, the third party 116 accesses the SMS copy database through the monitor service 116. In some embodiments, the third party periodically downloads the copies of the messages and reviews or runs filtering programs on the messages himself (e.g., the filtering and analysis is done on the third party computer 110, not the monitor service system 116.)

Figure 2A:
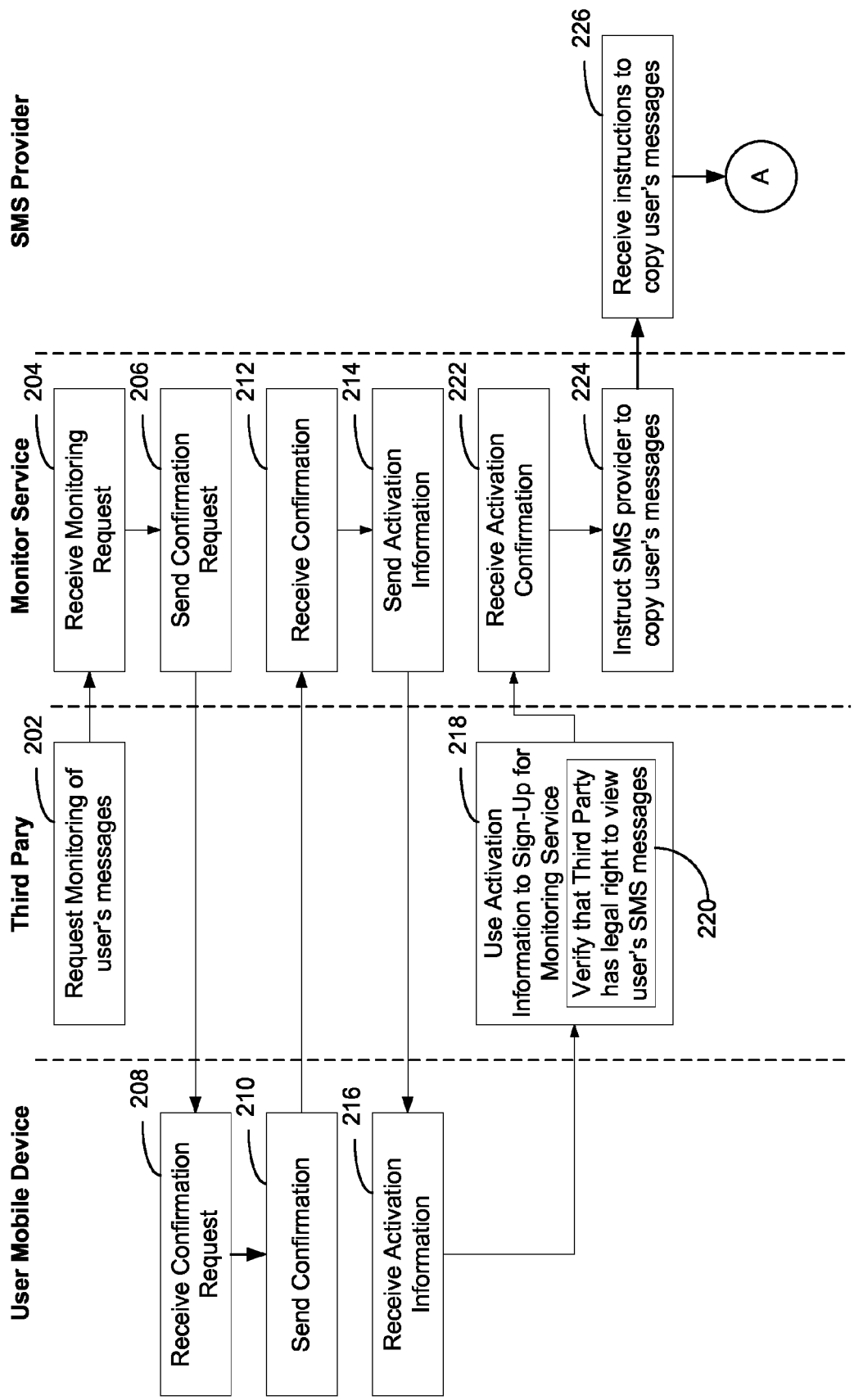
FIGS. 2A and 2B are flowcharts representing a method of initiating and performing text message monitoring, in accordance with some embodiments of the invention
Figure 2B:
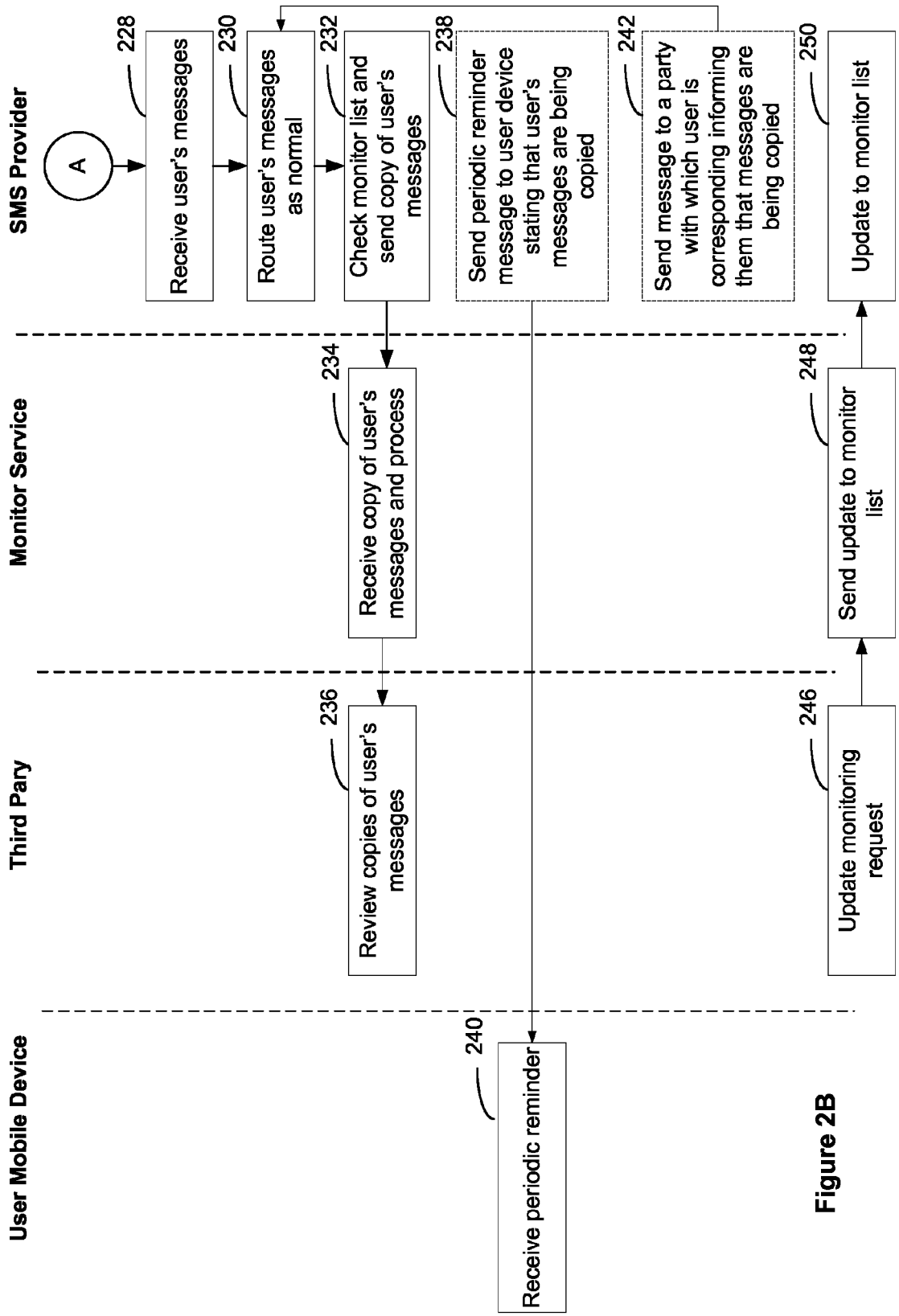

FIGS. 2A and 2B are flowcharts representing methods of initiating and performing text message copying, in accordance with some embodiments of the invention. These methods may be governed by instructions that are stored in a computer readable storage medium and that are executed by one or more processors of the various systems/devices shown in FIGS. 3-5. Each of the operations shown in FIGS. 2A-2B may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors as discussed in more detail with respect to FIGS. 3-5.

The method begins with a third party sending a request to monitor a user's messages (202). In some embodiments, the request is sent from the user's mobile device, while in other embodiments the request is sent from the third party's computer or mobile device. In some embodiments, the request is sent directly to the monitor service. The monitor service receives the monitoring request (204). It then sends a confirmation request, sometimes called an opt-in message or opt-in request, to the user's mobile device (206). In some embodiments, the confirmation/opt-in request message states that the third party has requested permission to copy and view textual SMS messages sent to and from the user's mobile device, and requests confirmation that the user agrees to this arrangement. In some embodiments, the opt-in/confirmation message also includes an indication of the price of the monitoring service and requests confirmation that this price should be charged to the mobile account associated with the user's mobile device. A confirmation is then sent from the user's mobile device (210). It should be noted that the person operating the user mobile device at the time the confirmation is sent could be the user, the third party, or another party, and as such further confirmation is performed to ensure that messages may be legitimately copied from the user's mobile device for third party review as described below with regard to the activation message as well as the sign up and confirmation information associated therewith.

The confirmation of the opt-in message is received by the monitor service (212). Then an activation message including activation information is sent from the monitor service to the user mobile device (214). In some embodiments, the activation message includes information for signing up on a monitoring website for monitoring of text messages to and from the mobile device. In some embodiments, the monitoring website is associated with the monitor service system while in other embodiments the monitoring website is distinct from the monitor service system. In some embodiments, the information for signing up includes an account number and a temporary password. In other embodiments, it further includes telephone contact information for alternatively signing up telephonically rather than on the monitoring website. The activation message is received on the user mobile device (216).

The third party uses the activation information including the account number and temporary password, to sign up for the monitoring service (218). It should be noted that in some embodiments, the third party signs up for the monitoring service by visiting the monitoring website from the user mobile device, but in other embodiments, the third party signs up for the monitoring service by visiting the monitoring website on a device distinct from the user mobile device, such as the third party computer. During the activation process, the third party confirms through various means that the third party's monitoring request is legitimate and legal (220). In some embodiments, the third party submits information to prove or certify that the third party has a legal right to view the user's messages, and thus the user's SMS text messages are allowed to be legitimately copied for viewing by the third party. For example, the third party certifies that they are a parent or legal guardian of the minor user. In some embodiments, the third party provides some or all of the following information: a new password, a confirmation of the phone number associated with the user mobile device, a phone number associated with the third party's mobile device, an email address, mailing address, and/or phone number for the third party, identification verification information such as social security numbers or driver's license numbers for the third party and the user, a verification of birthdates of the user and/or the third party, monitoring preferences, monitoring settings, and an explicit agreement to the terms and conditions of the monitoring service as well as an explicit sworn statement that the third party has a legal right to view the user's messages.

The monitor service receives the activation confirmation (222). The monitor service then instructs the SMS provider/carrier to add the user to a monitor list to copy the user's incoming and outgoing messages and (224). In some embodiments, the monitor service also instructs the SMS provider to alter the billing profile associated with the user mobile device. The SMS provider receives instructions to copy the user's messages and adds them to a monitor list (226), and the process continues as shown in FIG. 2B.

The SMS provider receives the user's incoming and outgoing messages (228). In other words, the SMS provider receives a text message from a sender addressed to a receiver, wherein the user is either the sender or the receiver. The SMS provider routes the messages as normal, i.e., the messages are passed to their intended recipient (230). The SMS provider also checks the monitor list to see if the sender or receiver is on the list and when the sender or receiver is on the monitor list the SMS provider sends a copy of the text message to the monitoring service (232). As explained above, the monitor list is a list of subscribed users whose messages are allowed to be legitimately copied and viewed by a third party—as verified during the sign up process (step 220). In some embodiments, the SMS provider sends another copy of the text message directly to the SMS copy database (element 118 of FIG. 1). In some embodiments, the copies of the textual message contain textual content and may contain other information such as one or more of the following: a sender device identification (such as the phone number, and registered owner), the receiver device identification (such as its phone number and registered owner), a date received, a time received, and an attachment if any (such as a document, photograph, business card, calendar item, etc.)

It should be noted that the SMS provider assumes that a user (element 102 of FIG. 1) is the person associated with a particular user device (element 106 of FIG. 1). For example, when the SMS provider checks the monitor list for the sender or receiver, it checks to see if a particular user device or specific mobile phone number is on the monitor list. To ensure that the user is still the person using the user mobile device, periodic reminder messages are sent to the user mobile device as explained below.

The monitor service receives and processes the copy of the user's message (234). In some embodiments, processing includes reviewing the copies of the user's SMS textual messages for potentially dangerous or inappropriate content, and if potentially dangerous content is found, sending alert messages to the third party. However, this review and alert is merely optional, as the third party may prefer to monitor each message themselves. In embodiments where a copy of the message is not sent directly from the SMS provider to the SMS copy database, the processing at least involves storing each copy in the SMS copy database. Then the third party accesses and reviews the copies of the user's messages (236). In some embodiments, the third party will view the copies real-time. However, the third party also has the option of reviewing copies of the user's messages in batches. In some embodiments, the copies of the messages are viewable from the monitoring website using the third party's account number and password. In some embodiments, the third party can optionally delete messages after they have been reviewed, while in other embodiment the copies are permanent (or permanent for a fixed period of time.)

Periodically, the SMS provider sends reminder messages to the user device stating that the users messages are being copied (238). The user mobile device receives and displays the periodic reminder to the user, or whoever is viewing the user device (240). In some embodiments, the periodic message is sent with every SMS textual message, in other embodiments it is sent after a fixed period of time such as once a minute, once an hour, once a day, once a week, etc. As such, the user of the user device is reminded that the messages to and from that device are being legally/legitimately copied. In some embodiments, the reminder message also includes information for canceling the copying service. Thus, if a new user is using the device, he/she can take subsequent action to cancel the service. For example, if the new user is not the original user whose messaged may be legitimately viewed by the third party, then the new user has the opportunity to notify the monitor service and request that the message copying program be stopped. If no action to cancel the service is taken than the copying service continues.

In some embodiments, especially if the SMS provider determines that either the sender or receiver of the message has a mobile device that is registered in or is being used in a two party consent state, the method further includes sending a message to both the sender and the receiver (i.e., both the user and the non-user who is communicating with the user) that a copy of the text message will be sent to a remote text messaging monitoring system (242). For example, each party is given an opportunity to cancel the text message such that it is not copied and passed on to the monitoring service. In some embodiments, both the sender and the receiver are required to accept before the message is delivered. In other embodiments, the message is delivered if no objection to the copying is made within a predetermined period of time. In other words, the method includes delaying sending a copy of the text message to a remote monitoring system until after a period of time has elapsed and no cancellation of the textual message has been received.

In some embodiments, the monitoring request is updated (246). In some embodiments, the monitoring update is a change in monitoring preferences or monitoring settings. In other embodiments, the monitoring update is an addition or deletion of a user device to be monitored. In some embodiments the update to the monitoring request is sent from the user or the third party. In other embodiments, an update to the monitoring request is automatic when the user reaches a specified age. For example, once the user reaches a legal age past which the third party parent or guardian is no longer legally allowed to view a copy of the user's textual messages, the monitor list is automatically updated to remove the user mobile device from the list. In other embodiments, when the user reaches the specified age, the user is required to explicitly verify that the third party is still given permission to view copies of the user's textual messages. The monitor service (or monitoring website) sends the update to the monitor list (248). Then the SMS provider receives the update to the monitor list and updates the monitor list according to the update (250).

It should be noted that in the embodiments discussed above, communications were described as being sent directly to the monitor service from the mobile device and vice versa. In other embodiments, some or all of the communications are routed through the SMS provider/carrier.

Figure 3:
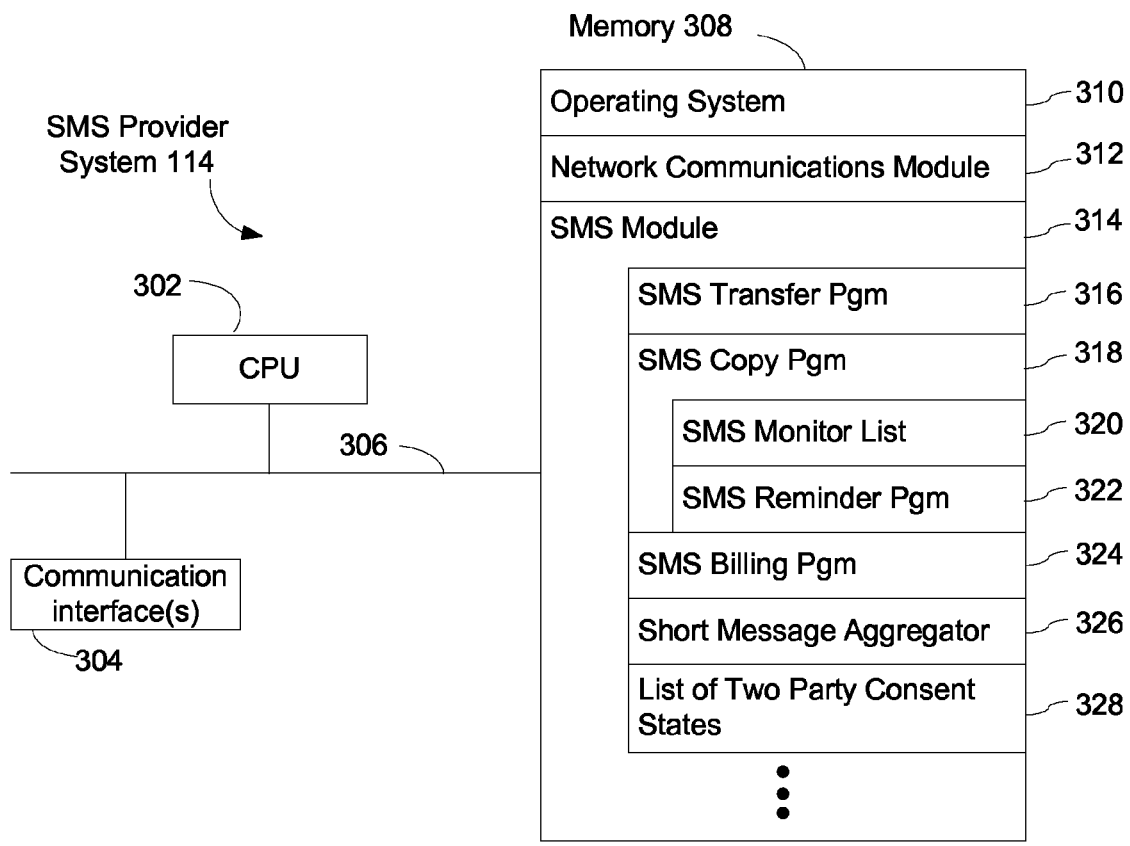
FIG. 3 is a block diagram illustrating an exemplary SMS provider system, in accordance with one embodiment of the invention.

FIG. 3 is a block diagram illustrating an exemplary SMS provider system 114. The SMS provider system 114 generally includes one or more processing units (CPU's) 302, one or more network or other communications interfaces 304, memory 308, and one or more communication buses 306 for interconnecting these components. The communication buses 306 may include circuitry (sometimes called a chipset) that interconnects and controls communications between system components. Memory 308 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 308 may optionally include one or more storage devices remotely located from the CPU(s) 302. Memory 308, or alternately the non-volatile memory device(s) within memory 308, comprises a computer readable storage medium. In some embodiments, memory 308 stores the following programs, modules and data structures, or a subset thereof:

- an operating system 310 that includes procedures for handling various basic system services and for performing hardware dependent tasks;
- a network communication module 312 that is used for connecting the SMS provider system 114 to other computers, devices and systems such as the monitor service 116, optionally to the SMS copy database 118, other SMS providers, and all mobile devices that are capable of communicating directly with the SMS provider system (including at least the user mobile device 106) via the one or more communication network interfaces 304 (wired or wireless) and one or more communication networks 112, such as the Internet, cellular network, other wide area networks, local area networks, metropolitan area networks, and so on;
- an SMS module 314 for handling all communications and programs involved with SMS messaging including the following:
    - a SMS transfer program 316 for performing normal SMS transfers such as receiving a textual message from a sender and sending it to a receiver
    - a SMS copy program 318 which copies the textual messages of sent or received on user mobile devices who are on a SMS monitor list 322 and sends the copies to the monitor service 116 and/or the copy database 118 and also updates the SMS monitor list when new users are added or existing user accounts are updated;
    - the SMS monitor list 320 which lists the subscribed users whose messages are allowed to be legitimately copied and viewed by a third party having a legal right to view the user's messages (such as a parent or guardian);
    - and SMS copying reminder program 322 which sends reminder messages to the user and optionally a party communicating with the user via SMS text messages reminding them that the messages are being copied and providing information to cancel the message and/or cancel the copying service;

an SMS billing program 324 which alters a billing profile associated with a user mobile device when the user mobile device is successfully registered;

an optional short message aggregator 326 which receives and processes short message codes such as a short message request through the user's mobile device to monitor messages to and from the user mobile device; and a list of states two party consent states 328, that is a governmental list of states that require two party consent for copying of messages transferred over a telephone network or other network.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 308 may store a subset of the modules and data structures identified above. Furthermore, memory 308 may store additional modules and data structures not described above.

Although FIG. 3 shows an SMS provider system, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a monitor service system and how features are allocated among them will vary from one implementation to another.

Figure 4:
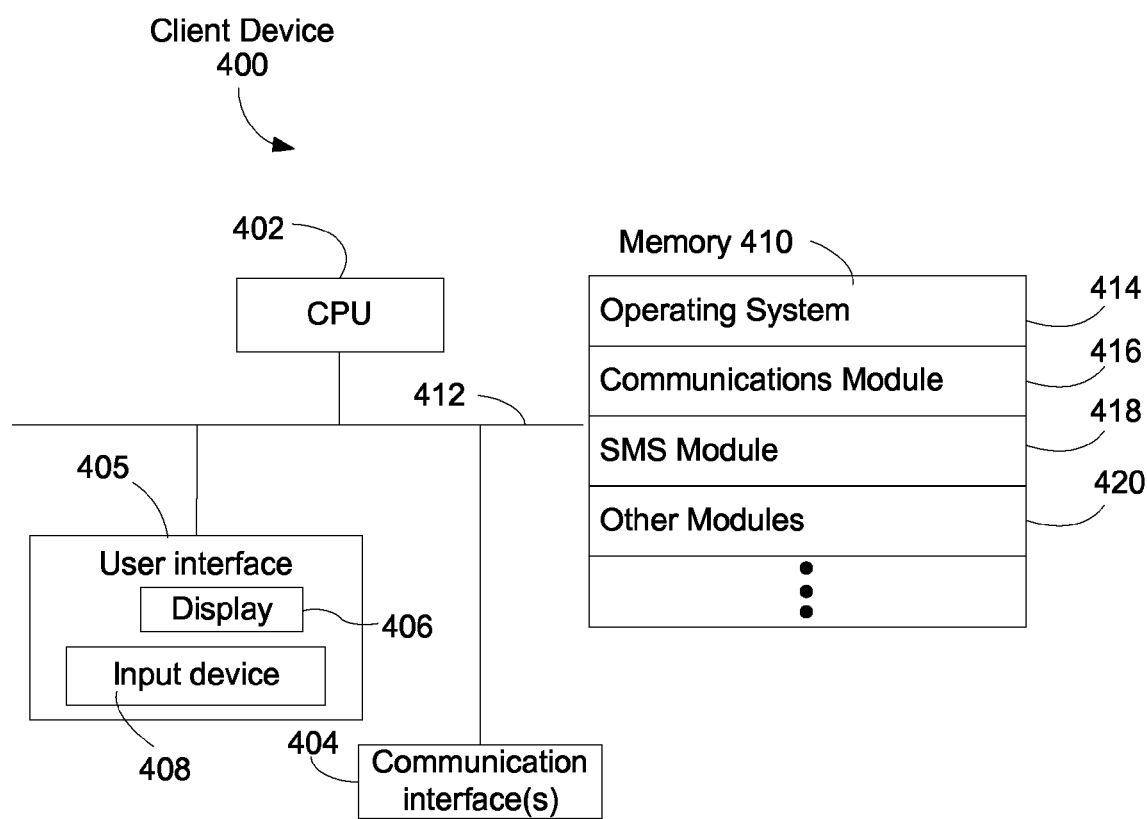
FIG. 4 is a block diagram illustrating an exemplary client device such as a user mobile device, in accordance with one embodiment of the invention.

FIG. 4 is a block diagram illustrating an exemplary client device 400 such as a user mobile device 106 (or third party mobile device 108), in accordance with one embodiment of the invention. The client device 400 typically includes one or more processing units (CPU's) 402, one or more network or other communications interfaces 404, memory 410, and one or more communication buses 412 for interconnecting these components. The client device 400 optionally may include a user interface 405 comprising a display device 406 and a keyboard, mouse, touch screen or other input mechanism 408. Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 stores the following programs, modules and data structures, or a subset thereof:

an operating system 414 that includes procedures for handling various basic system services and for performing hardware dependent tasks;

a network communication module 416 that is used for connecting client device 106 to other computers via the one or more communication interfaces 404 (wired or wireless) and one or more communication networks 112, such as the Internet, cellular network, other wide area networks, local area networks, metropolitan area networks, and so on;

an SMS module 418 for recording input from the input device forming a SMS textual message, sending SMS textual messages, receiving, and displaying textual messages on the display 406 (the received and displayed messages including messages from individual senders as well as reminder messages and the confirmation and activation messages sent from the monitor service during activation of the copying and monitoring service described herein.)

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows a client device, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a monitor service system and how features are allocated among them will vary from one implementation to another.

Figure 5:
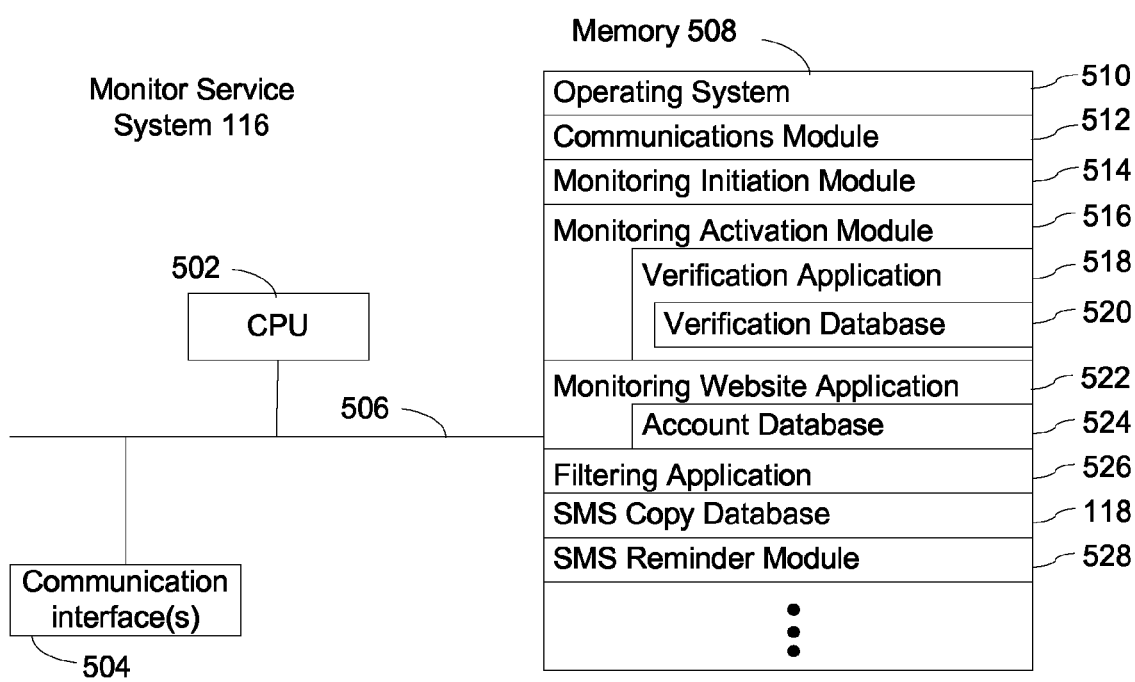
FIG. 5 is a block diagram illustrating an exemplary monitor service system, in accordance with one embodiment of the invention.

FIG. 5 is a block diagram illustrating an exemplary monitor service system 116, in accordance with one embodiment of the invention. The monitor service system 116 generally includes one or more processing units (CPU's) 502, one or more network or other communications interfaces 504, memory 508, and one or more communication buses 506 for interconnecting these components. The communication buses 506 may include circuitry (sometimes called a chipset) that interconnects and controls communications between system components. Memory 508 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 508 may optionally include one or more storage devices remotely located from the CPU(s) 502. Memory 508, or alternately the non-volatile memory device(s) within memory 508, comprises a computer readable storage medium. In some embodiments, memory 508 stores the following programs, modules and data structures, or a subset thereof:

an operating system 510 that includes procedures for handling various basic system services and for performing hardware dependent tasks;

a network communication module 512 that is used for connecting the monitor service system 116 to other computers, devices and systems such as the SMS provider 114, the SMS copy database 118, and optionally the user mobile device 106 and/or third party mobile device 108 via the one or more communication network interfaces 504 (wired or wireless) and one or more communication networks 112, such as the Internet, cellular network other wide area networks, local area networks, metropolitan area networks, and so on;

a monitoring initiation module 514 for receiving a request for monitoring text messages to and from a user mobile device and sending an confirmation request/opt-in message to the user mobile device, a monitoring activation module 516 which, in response to receiving an opt-in confirmation from the user mobile device, sends an activation message including information for signing up for monitoring of text messages to and from the mobile device (including a temporary account number and password for a monitoring website), a verification application 518 which receives information from a third party during the sign-up process and verifies that the third party has a legal right to view the user's SMS messages by among other methods, checking the verification information in a verification database 520;

an optional monitoring website application 522, included in the monitor service system 116 in some embodiments, which receives activation information from the third party for signing up for copying and monitoring of the user's SMS textual messages, and also receives and stores in an account database 524 account information regarding the user and the third party as well as account monitoring preferences and monitor settings, and which allows the third party to access and monitor copies of the user's SMS textual messages;

and optional filtering application 526 that optionally reviews copies of the user's SMS textual messages and sends alert messages to the third party if potentially dangerous content is found;

a SMS copy database 118, which is included in the monitor service system 116 in some embodiments, which stores copies of the textual message content for viewing by the third party, and optionally also stores textual message attachments, and related information associated with each textual message sent to or received from the user; and an SMS Reminder Module 528 that sends periodic reminder messages to the user device stating that the users messages are being copied and may also send similar messages to a party communicating with the user informing them of the copying, and in some embodiments requiring an active or passive consent from the communicator and/or the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 508 may store a subset of the modules and data structures identified above. Furthermore, memory 508 may store additional modules and data structures not described above.

Although FIG. 5 shows a monitor service system, FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a monitor service system and how features are allocated among them will vary from one implementation to another.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
at a text message carrier server system having one or more processors and memory storing one or more programs for execution by the one or more processors:
receiving a text message from a sender addressed to a receiver;
sending the text message to the receiver;
checking by the text message carrier system, a monitor list for the receiver or the sender, wherein the monitor list is a list of subscribed users;
after sending the text message to the receiver, when the receiver or the sender is on the monitor list, sending from the text message carrier system a copy of the sent text message content to a remote text message monitoring system distinct from the text message carrier system, wherein the remote text messaging monitoring system is configured to provide access to the copy of the sent text message content by an authorized third party; and
sending periodic reminder messages to the sender stating that the sender's messages are being copied.

2. The method of claim 1, wherein the copy of the sent text message content includes one or more of: a sender's identification, a receiver's identification, a date received, a time received, and a text message attachment.

3. The method of claim 2, wherein the text message attachment is a photograph.

4. The method of claim 1, wherein the third party is a guardian and the user is a minor.

5. The method of claim 1, further comprising,
receiving an update to the monitor list; and
updating the monitor list according to the update.

6. The method of claim 5, wherein the update is removing a user from the monitor list when the user reaches a specified age.

7. The method of claim 1, further comprising:
determining if the sender or receiver is registered in a two party consent state; and
if either the sender or the receiver is registered in a two party consent state, sending a message to both the sender and the receiver that a copy of the sent text message content will be sent to a remote text message monitoring system unless either the sender or the receiver cancels the message within a predetermined period of time.

8. The method of claim 7, wherein the sending a copy further comprises:
delaying sending a copy of the sent text message content to a remote text message monitoring system until after the predetermined period of time has elapsed and no cancellation of the text message has been received.

9. The method of claim 1, wherein the remote text message monitoring system is further configured to review the copy of the sent text message for potentially dangerous or inappropriate content.

10. The method of claim 9, wherein the remote text message monitoring system is further configured to send an alert message to the corresponding third party associated with the receiver or sender of the sent text message when potentially dangerous or inappropriate content is found.

11. The method of claim 1, wherein the remote text message monitoring system is configured to allow password protected access to the copy of the sent text message on a monitoring website associated with the remote text message monitoring system.

12. A computer-implemented method of initiating text message monitoring comprising:
at a message monitoring service having one or more processors and memory storing one or more programs for execution by the one or more processors:
receiving a request for monitoring text messages to and from a client device associated with a user;
sending an opt-in message to the client device;
receiving a confirmation of the opt-in message from the client device;
after receiving the confirmation of the opt-in message and before instructing a text message carrier, sending to the client device an activation message including information for signing up on a monitoring website for monitoring of text messages to and from the client device, wherein the information for signing up includes account authorization details;
receiving at the message monitoring service from the website confirmation that the monitoring request is legitimate and legal and that the client device has been set up for monitoring of messages to and from the client device, wherein the website confirmation is based in part on the information from the activation message; and
instructing the text message carrier server system to copy each message sent to or from the client device.

13. The method of claim 12, wherein the client device is a mobile device associated with a user whose text messages are allowed to be legitimately copied and viewed by a corresponding third party having a legal right to view the user's messages.

14. The method of claim 12, wherein the monitoring website is distinct from the server system.

15. The method of claim 12, wherein the activation message includes information comprising: an account number and a temporary password.

16. The method of claim 12, further comprising:
instructing a text message carrier server system to alter a billing profile associated with the client device.

17. A computer-implemented method of initiating text message monitoring comprising:
at a client device having one or more processors and memory storing one or more programs for execution by the one or more processors:
receiving on the client device, an opt-in text message requiring confirmation of a monitoring request;
from the client device, responding to the opt-in message by confirming the monitoring request;
after responding to the opt-in message, receiving on the client device, an activation text message including information for signing up on a monitoring website for monitoring of text messages to and from the client device, wherein the information for signing up includes account authorization details; and
visiting the monitoring website and signing up for monitoring of text messages to and from the client device according to the information received in the activation message.

18. The method of claim 17, wherein the visiting the monitoring website is performed on a second device distinct from the client device.

19. The method of claim 17, wherein signing up includes providing one or more of: a phone number associated with the client device, a monitor's email address, a monitor's phone number, a monitor's password, and monitoring preferences and settings.

20. A text message carrier system, for copying textual messages, comprising:
at least one processor; and
memory storing one or more programs to be executed by the at least one processor;
the one or more programs comprising instructions for:
receiving a text message from a sender addressed to a receiver;
sending the text message to the receiver;
checking, by the text message carrier system a monitor list for the receiver or the sender, wherein the monitor list is a list of subscribed users;
after sending the text message to the receiver, when the receiver or the sender is on the monitor list, sending from the text message carrier system a copy of the sent text message content to a remote text message monitoring system distinct from the text message carrier system, wherein the remote text messaging monitoring system is configured to provide access to the copy of the sent text message content by an authorized third party; and
sending periodic reminder messages to the sender stating that the sender's messages are being copied.

21. A monitor service system, for initiating text message monitoring, comprising:
a message monitoring service having at least one processor; and
memory storing one or more programs to be executed by the at least one processor;
the one or more programs comprising instructions for:
receiving a request for monitoring text messages to and from a client device associated with a user;
sending an opt-in message to the client device;
receiving a confirmation of the opt-in message from the client device;
after receiving the confirmation of the opt-in message and before instructing a text message carrier, sending to the client device an activation message including information for signing up on a monitoring website for monitoring of text messages to and from the client device, wherein the information for signing up includes account authorization details;
receiving at the message monitoring service from the website confirmation that the monitoring request is legitimate and legal and that the client device has been set up for monitoring of messages to and from the client device, wherein the website confirmation is based in part on the information from the activation message; and
instructing the text message carrier server system to copy each message sent to or from the client device.

22. A client device, for initiating text message monitoring, comprising:

at least one processor; and memory storing one or more programs to be executed by the at least one processor;

the one or more programs comprising instructions for:

receiving an opt-in text message requiring confirmation of a monitoring request;

responding to the opt-in message by confirming the monitoring request;

after responding to the opt-in message, receiving activation text message including information for signing up on a monitoring website for monitoring of text messages to and from the client device, wherein the information for signing up includes account authorization details; and visiting the monitoring website and signing up for monitoring of text messages to and from the client device according to the information received in the activation message.

23. A non-transitory computer readable storage medium storing one or more programs configured for execution by a text message carrier server system, the one or more programs comprising instructions for:

receiving a text message from a sender addressed to a receiver;

sending the text message to the receiver;

checking by the text message carrier system, a monitor list for the receiver or the sender, wherein the monitor list is a list of subscribed users;

after sending the text message to the receiver, when the receiver or the sender is on the monitor list, sending from the text message carrier system a copy of the sent text message content to a remote text message monitoring system distinct from the text message carrier system, wherein the remote text messaging monitoring system is configured to provide access to the copy of the sent text message content by an authorized third party; and sending periodic reminder messages to the sender stating that the sender's messages are being copied.

24. A non-transitory computer readable storage medium storing one or more programs configured for execution by a computer system, the one or more programs comprising instructions for:

receiving at a message monitoring service a request for monitoring text messages to and from a client device associated with a user;

sending an opt-in message to the client device;

receiving a confirmation of the opt-in message from the client device;

after receiving the confirmation of the opt-in message and before instructing a text message carrier, sending to the client device an activation message including information for signing up on a monitoring website for monitoring of text messages to and from the client device, wherein the information for signing up includes account authorization details;

receiving at the message monitoring service from the website confirmation that the monitoring request is legitimate and legal and that the client device has been set up for monitoring of messages to and from the client device, wherein the website confirmation is based in part on the information from the activation message; and instructing the text message carrier server system to copy each message sent to or from the client device.

25. A non-transitory computer readable storage medium storing one or more programs configured for execution by a client device, the one or more programs comprising instructions for:

receiving on the client device, an opt-in text message requiring confirmation of a monitoring request;

from the client device, responding to the opt-in message by confirming the monitoring request;

after responding to the opt-in message, receiving on the client device, activation text message including information for signing up on a monitoring website for monitoring of text messages to and from the client device, wherein the information for signing up includes account authorization details; and visiting the monitoring website and signing up for monitoring of text messages to and from the client device according to the information received in the activation message.

\* \* \* \* \*

UNITED STATES PATENT AND TRADEMARK OFFICE
CERTIFICATE OF CORRECTION

PATENT NO. : 9,015,253 B1  
APPLICATION NO. : 12/837372  
DATED : April 21, 2015  
INVENTOR(S) : Jarrett Page 1 of 1

It is certified that error appears in the above-identified patent and that said Letters Patent is hereby corrected as shown below:

Title page, item (73) Assignee: please delete "Amber Watch" and insert --AmberWatch--.

Signed and Sealed this
Eighth Day of September, 2015

Michelle K. Lee
*Director of the United States Patent and Trademark Office*